(12) United States Patent
Tyckowski

(10) Patent No.: US 6,360,486 B1
(45) Date of Patent: Mar. 26, 2002

(54) WINDOW OBJECT DETECTION SYSTEM WITH VIBRATION COMPENSATION

(75) Inventor: Joseph Tyckowski, Clawson, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/596,125

(22) Filed: Jun. 16, 2000

(51) Int. Cl.$^7$ ................................................ E05F 15/02
(52) U.S. Cl. ............................................ 49/26; 49/506
(58) Field of Search .............................. 49/26, 27, 28, 49/506; 200/61.43; 318/264

(56) References Cited

U.S. PATENT DOCUMENTS

| | | | | |
|---|---|---|---|---|
| 5,616,997 A | * | 4/1997 | Jackson et al. ............. | 49/28 X |
| 5,706,362 A | * | 1/1998 | Yabe .......................... | 382/103 |
| 5,729,104 A | * | 3/1998 | Kamishima et al. ......... | 49/28 X |
| 5,754,017 A | * | 5/1998 | Tsuge et al. ................. | 49/28 X |
| 5,774,046 A | * | 6/1998 | Ishihara et al. ............. | 49/28 X |
| 5,955,854 A | * | 9/1999 | Zhang et al. ............... | 318/480 |
| 5,977,732 A | * | 11/1999 | Matsumoto ................. | 49/28 X |
| 6,051,945 A | * | 4/2000 | Furukawa ............... | 318/264 X |
| 6,091,406 A | * | 7/2000 | Kambara et al. ........... | 345/177 |
| 6,169,379 B1 | * | 1/2001 | Zhang et al. ............... | 318/280 |

\* cited by examiner

*Primary Examiner*—Jerry Redman
(74) *Attorney, Agent, or Firm*—Carlson, Gaskey & Olds

(57) ABSTRACT

The effect of vibration on an obstruction detection system for a vehicle closure member is utilized to eliminate false identifications of an obstruction. The effect of vibration is measured, and utilized to change the expected value or limits relied upon to identify an obstruction. A characteristic such as speed is measured when it moves away from a predicted value in a direction opposed to the direction which would be indicative of an obstruction. In the case of speed, the system measures speed movement above the predicted value. The control senses the absolute value of the movement above the predicted speed value, and utilizes the absolute value to compensate for an expected upcoming valley below the predicted value. This compensation is either utilized to move the predicted value, or a limit, further downwardly. In this way, the expected valley will not move below the limit, which might otherwise result in a false indication of an obstruction. Although the invention is disclosed in a system monitoring speed, systems monitoring power, and torque would also benefit from this technique.

10 Claims, 2 Drawing Sheets

WINDOW OBJECT DETECTION SYSTEM WITH VIBRATION COMPENSATION

BACKGROUND OF THE INVENTION

This invention relates to a system for detecting and compensating for the vibrational effect on a closure characteristic, in the detection of an object in the closure path.

Vehicles are provided with closures such as windows, sunroofs, moonroofs, etc. These closures are typically closed by a power motor at the control of an operator input button. For purposes of this Application, the term "window" will extend to not only windows, but also to moonroofs, sunroofs and other closures which are moveable within a frame in the vehicle.

With the advent of powered closures in vehicles, a problem arose in detecting the presence of an object in the path of a closure member. As an example, when a switch is actuated to move a closure member to a closed position, a passenger may have an arm in the frame opening. The arm would be contacted by the window. It is desirable for a motor control to detect the presence of this obstruction.

Typically, systems for detecting an obstruction have looked at a characteristic, (e.g., the speed, power or torque on the motor), and looked for the characteristic to exceed a predetermined limit. If the limit is exceeded, then a determination is made that an object is present.

However, these systems have been prone to identifying "false" obstructions under certain conditions. One problem with these systems is that the characteristics being monitored are sensitive to vibration. Thus, should the vehicle be driven over a rough road surface, vibration on the vehicle affects the monitored characteristic. If the vibrational effect is significant, the monitored characteristic could cross the predetermined limit, and a false obstruction could be sensed. Typically, if an obstruction is sensed, the control either stops or reverses the motor. It would be desirable to eliminate, or at least minimize false obstruction readings.

As an example, FIG. 1A shows a system wherein predicted motor speed 20 is shown over time. The actual motor speed 22 under the presence of vibration is shown having peaks 24 and 28 and corresponding valleys 26 and 30. Generally, the effect of vibration on the characteristics, such as speed, will have a peak and a corresponding valley. In a system monitoring speed, if the detected speed drops below a predetermined limit 32, then an obstruction is identified.

It should be understood that known vehicle window obstruction systems monitor other characteristics such as power or torque. For example, in a power system, the predetermined limit will be above the predicted power value. That is, an obstruction will cause power to increase. This invention extends to monitoring characteristics other than speed.

A reading 34 is indicative of the speed when an object is encountered. This reading crosses the predetermined limit 32 at point 36. At point 36, the control for the system 19 identifies an obstruction and reverses the motor, or stops the motor.

As shown schematically in FIG. 1B, a motor 21 is powered by a control 19 to drive a closure member 23 into a frame 25. During this movement, the control 19 monitors a characteristic, such as motor speed, and identifies an obstruction based upon the monitored characteristic crossing predetermined limit 32.

However, a vibration caused valley, such as valley 30, which is deep enough, might also cross the predetermined limit 32. In such a case, the control 19 would identify struction in the path of the closed and would stop a reverse operation of the motor. This would be undesirable.

SUMMARY OF THE INVENTION

In a disclosed embodiment of this invention, a control looks for a change in a monitored characteristic in a direction opposed to the direction indicative of an obstruction. In a speed monitored system, this would mean a speed movement above the predicted speed. A speed above the predicted speed would not be indicative of an obstruction. Thus, the system assumes that such an increased speed is indicative of a vibration effect. The system determines the value of the movement above the predicted value, and may then multiply that value by a scaler value. The real value of the scaler times the amount above the speed value is then utilized as a correction below the speed value. The correction is held over a period of time to cancel out the upcoming expected valley in the speed value due to the vibration and its reaction. The compensation decays over time back toward zero. The compensation can alternatively be used to adjust the limit rather than the expected value.

In this way, the predicted speed value, or the limit, is modified to compensate for the effect of vibration. Should an obstruction be detected, the limit will still be crossed; however, the crossing will not be due simply to a vibration caused valley in the speed value. In this way, false identifications of an obstruction are eliminated or minimized.

As a refinement, the values at start up of window movement may be ignored for this invention. A high speed value is expected at start up and would not be indicative of vibration. Thus, a delay may be programmed into the control before the inventive vibration monitoring begins.

These and other features of the present invention can be best understood from the following specification and drawings.

DETAILED DESCRIPTION OF A PREFERRED EMBODIMENT

Figure 2:
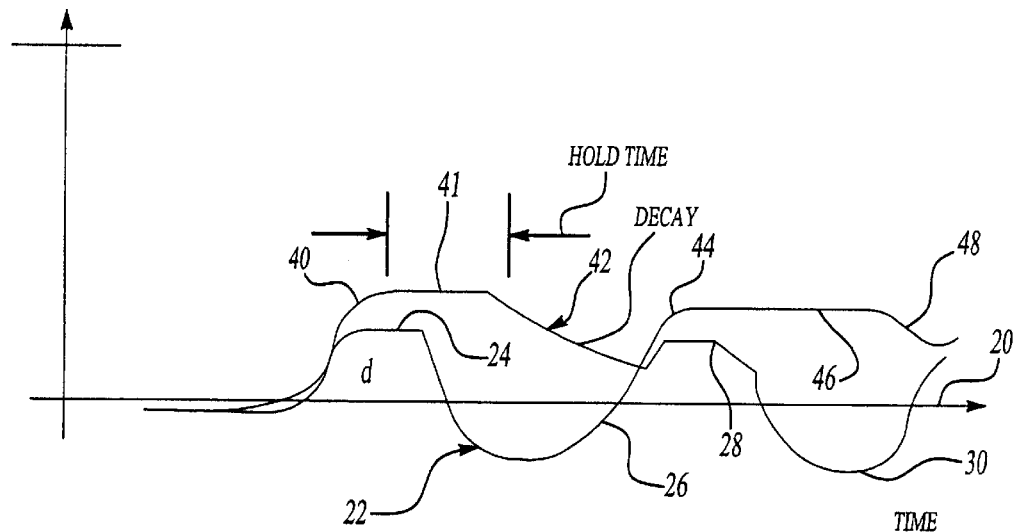
FIG. 2 is a graph of the calculation of the compensation value.

FIG. 2 shows an example vibration modified speed 22 having peaks 24 and 28 and corresponding valleys 26 and 30. Upon monitoring a peak, in a direction opposed to the direction of deviation caused by an obstruction on the monitored value, the system calculates a compensation value. The compensation value can be calculated as follows:

$$V_c = A \times (V_m - V_p)$$

That is, the system will monitor the actual movement d of the peak 24 above the predicted value 20, and multiply d by a scaler. Thus, as shown, the value 40 ($V_c$) is above the peak 24. This is due to the scaler value. It is preferred that the scaler be slightly over 1 so that the compensation value is slightly more than the amount of the vibration. In this way, if the valley is slightly deeper than the peak, and no false readings are reached After a hold period 41 over time, which can be based on the length of time of upward movement 28, a decay function 42 is then begun. As shown, a second upward correction 44 begins with the beginning of the next peak 24. A second hold portion 46 and a corresponding decay 48 will also be calculated. Again, it may be that at initial start up, high values are ignored, and assumed to be part of normal start up.

Notably, a compensation value is calculated only for readings which are in an opposed direction to that which would be expected for an obstruction. As disclosed, it is speed which is monitored. An obstruction would tend to move the speed below the predicted value. Thus, for the vibration compensation function, the system only reads speed values above the predicted value. In a system monitoring power, an obstruction would tend to move the measured power above the predicted line. In such a system, the effect of vibration would be measured when it moves below the predicted value. The reason for measuring movement in the opposed direction is to not mistake an obstruction as a vibration.

Figure 3:
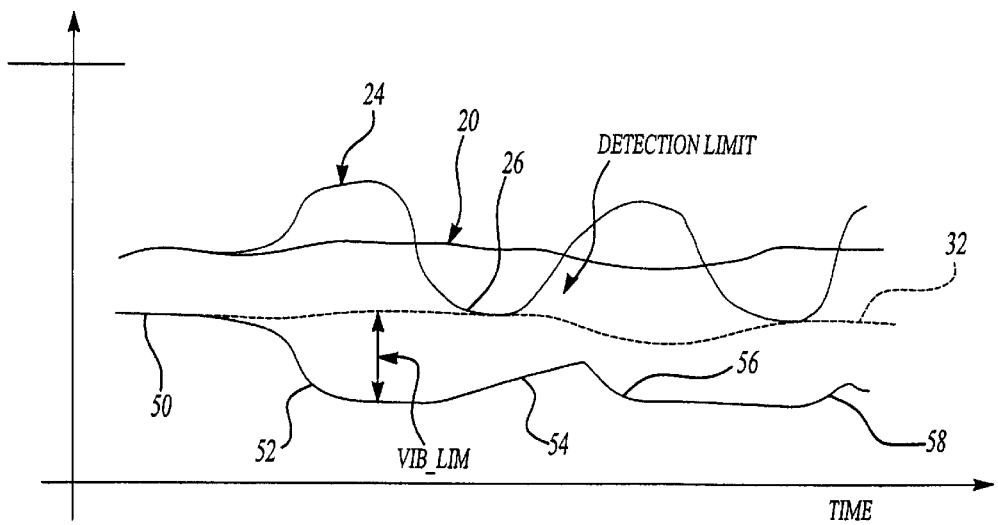
FIG. 3 is a graph of a system response incorporating the compensation value.

As shown in FIG. 3, a calculated compensation value is added to the limit such that a corrected limit 50 is moved below the nominal limit 32. Thus, the limit has a portion 52 corresponding to the portion 42 to compensate for the expected valley 26, and a decay portion 54 corresponding to the portion 42. A further ramp portion 56 corresponds to portion 46, and a second decay portion 58 corresponds to portion 48. The length of time for the decay and the hold can be calculated based upon the time length of the vibration waves 24 and 28.

Figure 1A:
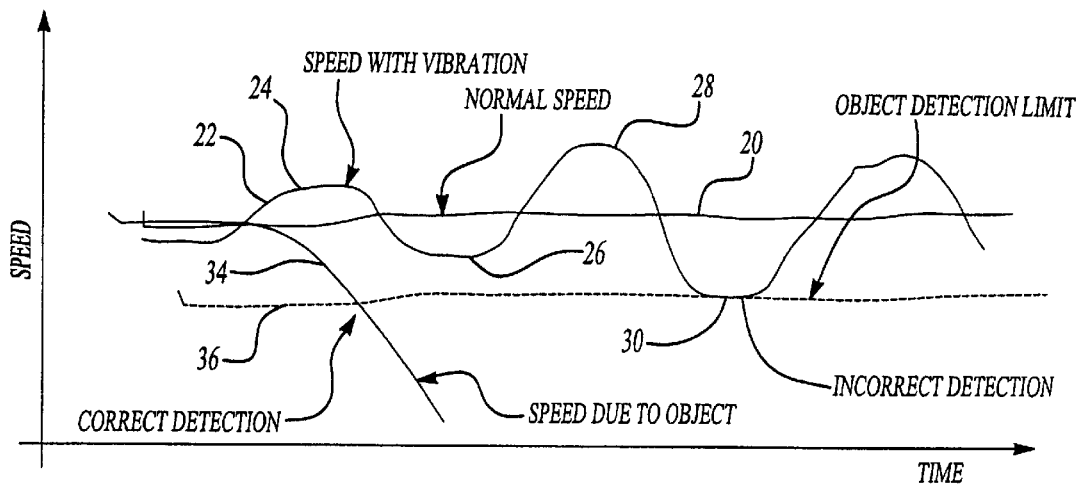
FIG. 1A is a graph of a prior art system.
Figure 1B:
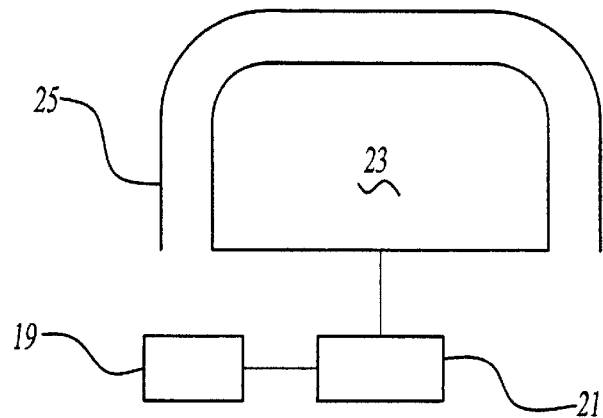
FIG. 1B schematically shows a window system.

As shown, with the prior art FIG. 1A, a valley 30 would cross the predetermined limit 32 and be identified as an obstruction. However, due to compensation 56, the valley 30 does not cross the limit 50, and no false obstruction is identified. At the same time, an obstruction, such as reading 34, would still cross the lower limit, and would be identified.

While FIG. 3 shows the compensation value being utilized to move the limit, the limit could be set to be spaced from the predicted value by a predetermined amount, and the compensation could be used to move the predicted value. The present invention preferably includes a control which is capable of quickly predicting an upcoming valley, and applying the compensation value to either the limit or the predicted value in a very short time frame. The exact details of the control, including hardware and software, are within the skill of a worker in this art.

A worker of ordinary skill in this art would recognize that certain modifications would come within the scope of this invention. For that reason, the following claims should be studied to determine the true scope and content of this invention.

What is claimed is:

1. A window closure monitoring system comprising:

a closure member movable within a frame and through a closure path, and a motor for driving said closure member;

a control for said motor, and for monitoring at least one characteristic which is variable upon the presence of an obstruction in the path of said closure, said control being programmed to have a predicted characteristic value during said closure path of said closure, and said control being operable to monitor said characteristic during movement of said closure, said control being operable to identify the effect of vibration on said characteristic, and to determine a compensation value based upon said vibration effect, said control being operable to determine an obstruction based upon said monitored characteristic combined with said compensation value.

2. A system as set forth in claim 1, wherein said control has a predetermined limit spaced from said predicted value, and said vibration compensation is utilized to move said predetermined limit.

3. A system as set forth in claim 2, wherein said predetermined limit is spaced in a first direction from said predicted value, and said control determines said compensation value by reading monitored values in a second direction opposed to said first direction.

4. A system as set forth in claim 3, wherein said monitored values in said second direction are combined with a scaler value, and utilized as said compensation value.

5. A system as set forth in claim 4, wherein said compensation value decays over time and moves toward zero.

6. A system as set forth in claim 1, wherein said characteristic is speed.

7. A system as set forth in claim 6, wherein a predetermined limit is spaced below said predicted value, and said system looks for values above said predetermined value as an indication of a vibrational effect on said system.

8. A system as set forth in claim 1, wherein said compensation value is held constant over a period of time and then decays.

9. A method of monitoring movement of a closure member in a vehicle comprising the steps of:

(1) providing a closure member, a motor for moving said closure member movable through a path, and a control for monitoring operation of said motor, said control being operable to monitor at least one monitored value of said motor; and (2) monitoring said characteristic of said motor, and comparing said monitored characteristic to a predicted value, determining a vibration compensation value based upon said monitored value, and utilizing said vibration compensation value in combination with said predicted value to identify an obstruction in the path of said closure.

10. A method as set forth in claim 9, wherein a movement of said monitored characteristic in a direction opposed to a direction which would be indicative of an obstruction is utilized to determine said vibration compensation value.

* * * * *